United States Patent [19]

Turner et al.

[11] Patent Number: 5,014,211

[45] Date of Patent: May 7, 1991

[54] MICROPROCESSOR CONTROLLED LIQUID CHEMICAL DELIVERY SYSTEM AND METHOD

[75] Inventors: James R. Turner, Aptos; Stephen G. Hosking; James W. Livingston, both of Santa Cruz, all of Calif.

[73] Assignee: Diversey Corporation, Mississauga, Canada

[21] Appl. No.: 367,244

[22] Filed: Jun. 16, 1989

[51] Int. Cl.⁵ ...................... G05D 11/13; D06F 39/02

[52] U.S. Cl. .................................. 364/478; 364/502; 364/510; 222/59; 68/17 R; 68/207; 137/266

[58] Field of Search ............... 364/478, 500, 502, 510, 364/138; 137/624.2, 625.11, 266; 222/642, 144.5, 14, 59, 56, 651; 239/210; 68/17 A, 17 R, 207

[56] References Cited

U.S. PATENT DOCUMENTS

| | | | |
|---|---|---|---|
| 3,160,317 | 12/1964 | Hambro et al. | 222/1 |
| 4,441,340 | 4/1984 | Kaplan | 68/12 R |
| 4,524,801 | 6/1985 | Magnasco et al. | 137/567 |
| 4,648,043 | 3/1987 | O'Leary | 364/510 |
| 4,691,850 | 9/1987 | Kirschmann et al. | 222/642 |
| 4,845,965 | 7/1989 | Copeland et al. | 68/17 R |
| 4,932,227 | 6/1990 | Hogrefe | 68/17 R |
| 4,941,596 | 7/1990 | Marty et al. | 222/144.5 |

FOREIGN PATENT DOCUMENTS

| | | | |
|---|---|---|---|
| 2517709 | 12/1982 | France . | |
| 2069010 | 8/1981 | United Kingdom . | |

*Primary Examiner*—Jerry Smith
*Assistant Examiner*—Paul Gordon
*Attorney, Agent, or Firm*—Flehr, Hohbach, Test, Albritton & Herbert

[57] ABSTRACT

A liquid chemical delivery system automatically delivers viscous chemicals to a number of destinations, such as a number of industrial clothes washers. Several distinct chemicals are pumped, one at a time, into a manifold. The chemical being pumped is mixed with water in the manifold and then transported through a distribution line to its specified destination. By mixing the chemicals with water, viscous chemicals are diluted and delivered using a low pressure delivery system. A single flow meter is used to calibrate all the chemical metering pumps and to recalibrate those pumps periodically, thereby providing accurate chemical metering. The manifold and distribution tube are automatically flushed with water after every chemical delivery so as to reduce corrosion and maintenance costs. In addition, potentially reactive chemicals are kept separate from one another despite the use of only a single distribution line. The system uses a proof-of-flow conductivity meter in the manifold to confirm the presence of each specified chemical in the manifold during the chemical pumping process. Local proof-of-delivery conductivity meters at the system's output ports are used to verify delivery of each chemical to the specified output port.

17 Claims, 10 Drawing Sheets

MICROPROCESSOR CONTROLLED LIQUID CHEMICAL DELIVERY SYSTEM AND METHOD

The present invention relates generally to chemical dispensing systems and particularly to methods and systems for automatically delivering a variety of chemicals to specified destinations.

BACKGROUND OF THE INVENTION

The present invention is a system for safely and automatically delivering viscous chemicals to a number of destinations, such as a number of industrial clothes washers. An important feature of the invention is that a single set of chemical pumps with a single manifold and a single distribution tube are used to deliver chemicals to multiple destinations. In addition, the system has "proof of flow" logic for verifying that specified chemicals are dispensed into the manifold, and "proof of delivery" logic for verifying that each chemical arrives at its specified destination. Another aspect of the invention is that every chemical delivery event is followed by a water flush cycle so as to reduce corrosion and chemical induced equipment failures.

Chemicals are automatically metered and diluted as they are delivered to a specified destination. The system automatically dilutes viscous chemicals so that viscous chemicals can be delivered using low pressure fluid lines.

The ability to dilute and deliver viscous chemicals with low pressure allows the delivery of chemicals to relatively remote locations with low cost equipment.

The system's chemical pumps are automatically recalibrated on a periodic basis. This provides accurate metering of chemicals, and also allows the specification of chemical quantities in standard units such as ounces or milliliters.

The present invention deals with a number of problems that have long plagued commercial laundries and other cleaning systems which use caustic chemicals. For instance, it is less expensive to transport viscous, undiluted chemicals to the users of chemicals, but it has generally been difficult to accurately meter the amount of such chemicals used and therefore many commercial chemical delivery systems either avoid the use of viscous chemicals or suffer from the effects of using inconsistent quantities of chemicals. The chemical metering system of the present invention eliminates this problem by providing accurate metering of liquid chemicals.

A problem in many chemical delivery systems is corrosion of the pumps and tubes used to transport chemicals. Caustic chemicals attack many materials and require the frequent replacement of equipment. The present invention virtually eliminates this problem by automatically flushing all critical components with water after every chemical delivery. After each chemical is pumped, the pump is reversed, so that the pump (or the pump's tube) is not exposed to chemical for most of its life.

When using peristaltic pumps, another source of tube failure in many chemical delivery systems is back pressure on the output of the chemical pump. The accuracy of metering of chemicals is also affected by output pressure.

The present invention eliminates this problem by providing a relative vacuum on the output of the chemical pumps.

Caustic and viscous chemicals are often not metered, but rather pumped for a specified amount of time, because flow meters are expensive and the chemicals corrode and destroy the flow meters. The present invention automatically and accurately recalibrates each chemical metering pump. In addition, the present invention uses a single flow meter to measure all chemicals, thereby substantially reducing the cost of metering chemicals. Furthermore, this single flow meter is placed upstream of the system's manifold to avoid contact with and corrosion by the chemicals being dispensed.

Another problem in many chemical delivery systems is the need to prime the pumps which draw chemicals from a chemical supply. This is a problem because it is a task that the system operator must remember to perform. Failure to prime the chemical pumps results in the delivery of an improper amount of chemical during initial operation of the pumps, until the pumps have been primed through repeated use. The present invention solves this problem by automatically priming each chemical pump every time the pump is used. This is done by running the pump until the presence of the chemical is detected by a conductivity cell.

Prior art systems typically use a distinct delivery tube for each different chemical so as to avoid reactions between the various chemicals used. The present invention uses a single chemical distribution tube. Inadvertent chemical reactions are prevented by separating successively delivered chemicals with a sufficient amount of water so as to insure that the two chemicals do not react.

Another feature of the present invention is that it eliminates the problem of chemicals dripping from the ends of chemical delivery tubes. Such drips can damage equipment as well as clothing and people, and can cause unexpected chemical reactions between successively used chemicals. The present invention eliminates this problem by following every chemical delivery with a water flush.

SUMMARY OF THE INVENTION

In summary, the present invention is a liquid chemical delivery system for safely and automatically delivering viscous chemicals to a number of destinations, such as a number of industrial clothes washers. The system has a single set of chemical metering pumps which pump distinct chemicals into a manifold. The chemicals are mixed with water in the manifold and then the diluted chemicals are transported through a distribution tube to a specified destination. The system's proof of flow logic verifies that the proper amount of each chemical is dispensed in to the manifold. Proof of delivery logic verifies that the chemical is delivered to the specified destination.

A single water flow meter is used to calibrate all of the chemical metering pumps using a flow differential calculation method. The chemical metering pumps are recalibrated on a continuing basis each time that a pump is used.

The manifold and distribution tube are automatically flushed with water after every chemical delivery, thereby reducing corrosion and maintenance costs. In addition, potentially reactive chemicals are kept separate from one another despite the use of a single distribution line.

The system uses a "proof of flow" conductivity meter in the manifold to confirm the presence of each specified chemical in the manifold during the chemical pumping process. Each chemical metering pump is automatically primed each time that it is used by running the pump until the proof of flow conductivity cell detects the presence of chemical in the manifold. The system's proof of flow logic automatically detects when the supply of a chemical is exhausted and generates a corresponding error message. Local conductivity cells at the system's output ports are used to verify delivery of each chemical to the specified output port and to determine that amount of time to flush the system after chemical deliveries.

In the preferred embodiment, after each chemical is pumped into the manifold, the chemical pump is reversed, pulling water back into the tube so that the mechanically worked (and thus stressed) portion of the pump's tube is not exposed to chemical for most of its life.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
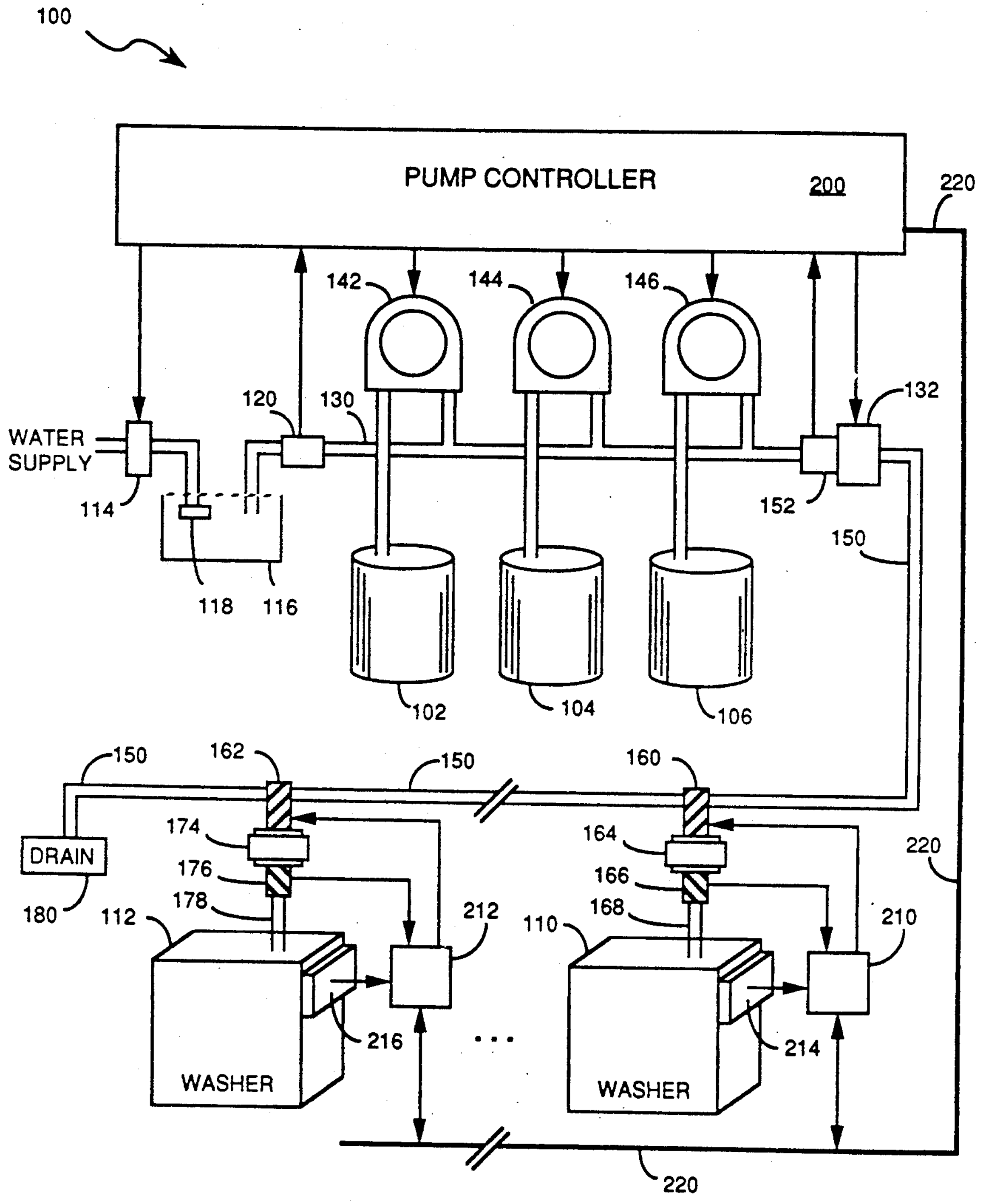
FIG. 1 is a block diagram of a chemical delivery system in accordance with the present invention.

Referring to FIG. 1, there is shown a chemical delivery system 100 in accordance with the present invention. In this example and in the preferred embodiment, the chemical delivery system 100 delivers chemicals from containers 102–106 to a number of washers 110–112. In industrial and commercial laundries, a number of distinct chemicals are used for washing clothes and linens. These chemicals are typically drawn from large containers in a specified sequence. Most prior art systems have a separate chemical pump station for each washer, controlled by a relatively simple sequence controller at each washer.

In the present invention, water is drawn from a water supply through a solenoid valve 114 into a break tank 116. A float valve 118 automatically lets water into the tank until a predefined water level is reached. Water is drawn from the break tank through a flow meter 120 into a manifold 130 by a positive displacement pump 132, herein called the transport pump. In one preferred embodiment the transport pump 132 is a positive displacement pump rated at two gallons per minute open flow with a maximum pressure of 50 psi. The amount of liquid pumped by the transport pump 132 can be accurately metered and this facility is used for the metering of chemicals, as will be described below.

Each chemical is drawn from its container 102–106 by a corresponding metering pump 142–146. In the preferred embodiment, the chemical metering pumps 142–146 are peristaltic pumps. Only one of the pumps 102–106 can be run at any one time. The output of each pump is coupled to the manifold 130 and thus the pumps 142–146 serve to add corresponding chemicals to the water in the manifold. Each chemical is diluted in the manifold 130 to reduce the viscosity of the chemical and to allow delivery of the chemical through a relatively narrow distribution tube 150 (e.g., a half inch diameter polyethylene tube is used in the preferred embodiment) at low pressure.

In the preferred embodiment the manifold 130 is made of half inch diameter stainless steel tubing.

It should be noted that the number of chemical containers 102–106 and pumps 142–146 will vary from system to system. In addition, the number of washers (also called output ports) will vary from system to system. The preferred embodiment can handle up to nine chemical containers and pumps, and up to eight washers. Further, two or more different sizes of chemical pumps may be used in a single system. Larger pumps (e.g., with a pumping capacity of 7 liters per minute) are used to dispense chemicals needed in relatively large quantities so that these chemicals can be dispensed in a timely fashion while smaller pumps (e.g., with a pumping capacity of 3 liters) are sufficient for other chemicals. In addition, each type of pump can be run at two distinct speeds. The slower of the two speeds (e.g., 1 liter per minute for the smaller pump) enables accurate metering of small chemical quantities. In the preferred embodiment, the use of two different sizes of metering pumps and the use of two pump speeds allows accurate metering of chemicals volumes which differ in size by a ratio of at least 1:8.

The water and chemicals in the manifold 130 are pumped into the distribution tube 150 by the transport pump 132. It should be noted that the volume of liquid pumped by the transport pump 132 always exceeds the amount of liquid being added to the manifold by the product pumps 142–146, and therefore water is drawn into the manifold. In other words, the pumping capacity or rate of the transport pump 132 is purposely selected to exceed the pumping capacity of any single one of the product pumps 142–146 so that chemicals are automatically diluted as they are delivered. Moreover, the ratio of water to chemical can be adjusted to minimize the viscosity of the chemical solution, and thereby minimize the pressure required to transport the solution through the distribution tube 150. Typical pumping pressures in the distribution tube are below 50 psi.

The presence or absence of a chemical in the manifold 130 is determined through the use of a "proof of flow" (POF) conductivity cell 152. The POF conductivity cell 152 measures the conductivity of the liquid in the manifold 130. In the preferred embodiment, the POF conductivity cell 152 measures the difference between the conductivity of the liquid in the manifold and the conductivity of the tap water from the water supply. Note that the conductivity of the water from the water supply will vary from location to location, and even from time to time, and that the use of relative conductivity measurements helps to avoid problems which might otherwise be caused by this variance.

Most of the chemical solutions used in cleaning systems have a measurably different conductivity than plain water, and thus a single conductivity cell 152 can be used to verify the presence of any one of the chemicals being used. The least conductive of all the chemicals typically used in an industrial laundry is fabric softener, and even fabric softener solutions typically have a conductivity that is two to three times that of plain water.

In the preferred embodiment the conductivity cell 152 is considered to be "active" whenever the measured conductivity exceeds the conductivity of plain water by a predefined factor (e.g., by a factor of 2). During a chemical feed, it is assumed that the chemical corresponding to the activated pump is in fact being pumped into the manifold 130 when the proof of flow conductivity cell 152 is active. In other words, the presence of an "active" signal from the POF conductivity cell 152 indicates that the chemical pump is primed, and that the specified chemical is being successfully pumped from its container 102 into the manifold 130.

In another contemplated embodiment, a distinct conductivity range can be assigned to each chemical. The conductivity range for each chemical is defined in terms of a range of differentials from the conductivity of plain water. In this embodiment the conductivity cell 152 is considered active only when the measured conductivity falls in the corresponding predefined range for the selected chemical. Many of the chemicals used in cleaning system have sufficiently different conductivity levels that they can be distinguished by conductivity measurements. This feature helps detect when the wrong chemical has been connected to a pump 142–146. If the conductivity cell measures a significant conductivity difference from water, but the measured conductivity is not within the predefined range for the selected chemical, an error message is generated indicating that the chemical on a particular pump may be incorrect.

Still referring to FIG. 1, chemicals travel through the distribution tube 150 to the washers 110–112 as follows. At each washer there is an electronically controlled diversion valve 160, 162. In the preferred embodiment, each diversion valve is a three way valve which has two positions: "bypass" and "feed". When the valve 160 is in the "feed" position, the liquid in the distribution tube 150 flows into the washer 110. More specifically, from the valve 160, liquid from the distribution tube 150 flows through connector 164, then a local "proof of delivery" (POD) conductivity cell 166 and connection tube 168 into the washer 110. When the valve 160 is in the "bypass" position the liquid in the distribution tube 150 bypasses the washer 110 and continues to flow through the distribution tube 150. Other types of diversion valves could be used in alternate embodiments of the invention.

Similarly, when the valve 162 is in the "feed" position, the liquid in the distribution tube 150 flows into the washer 112 via a connector 174, a proof of delivery (POD) conductivity cell 176 and a connection tube 178. When the valve 162 is in the "bypass" position the liquid in the distribution tube 150 bypasses the washer 112 and continues to flow through the distribution tube 150 past washer 112.

The diversion valves 160–162 are also called output ports for the distribution line 150. Thus, the system's control programs send specified chemicals to specified output ports.

Note that washer 112 is the last washer on the distribution tube 150. Liquid which passes through valve 162 when it is in the "bypass" position is disposed of in a drain 180.

Figure 2:
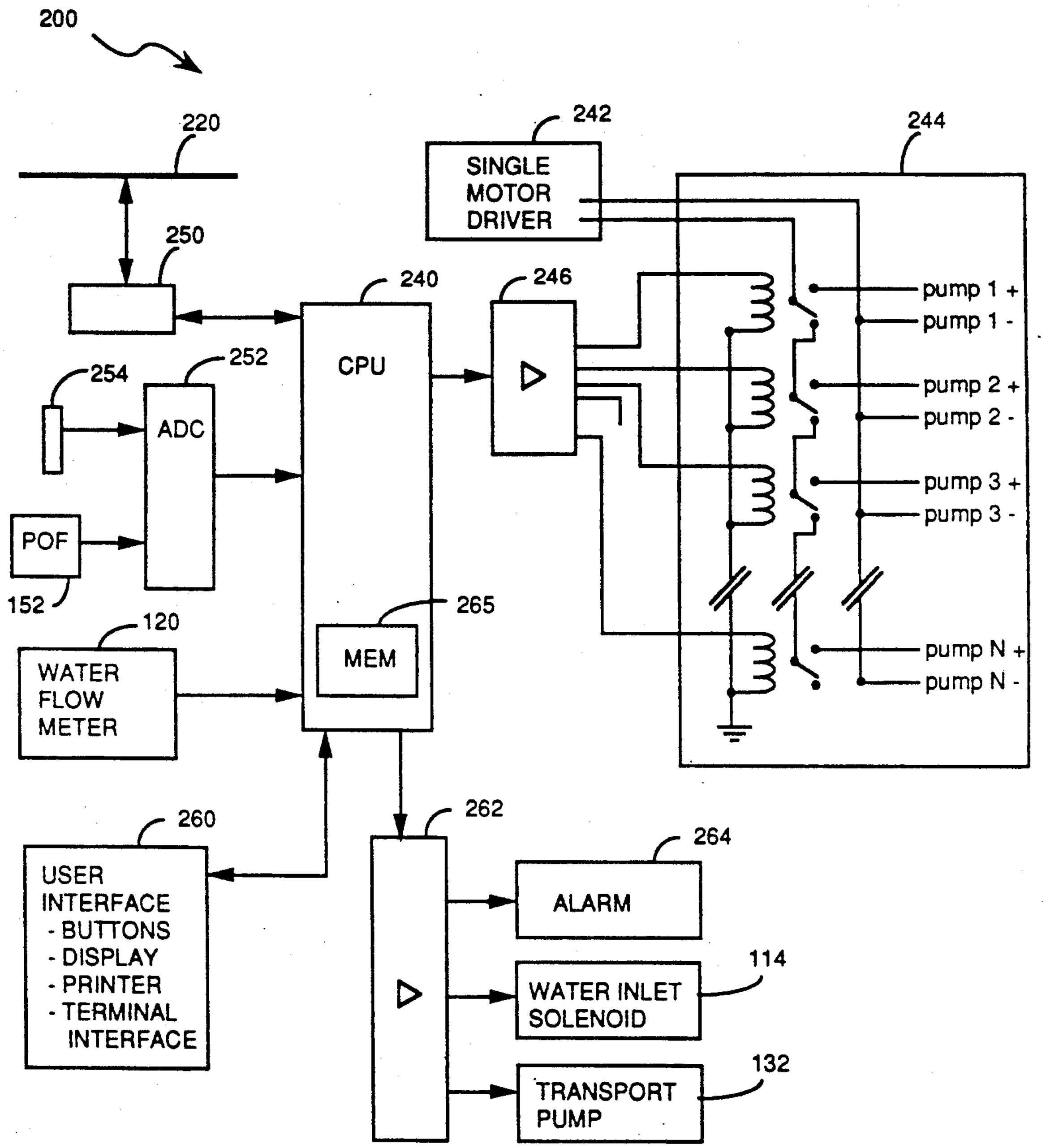
FIG. 2 is a block diagram of the pump controller in the preferred embodiment.

The operation of the chemical distribution system 100 is controlled by a pump controller 200, which is shown in more detail in FIG. 2. The pump controller 200 is a microprocessor-based control system which is coupled to all the controllable elements of the system 100. Thus it sends ON/OFF signals to the water supply solenoid 114, each of the chemical pumps 142–146, and to the transport pump 132.

As water flows into the manifold 130, the flow meter 120 generates outputs signals read by the controller 200. More particularly, the flow meter generates one pulse for each predefined volume or unit of water which flows through the meter 120. Each pulse from the flow meter 120 acts as an interrupt signal which causes a water metering interrupt routine in the pump controller to be run. The water metering interrupt routine in the pump controller 200 counts the flow pulses and thereby calculates the amount of water which has been added to the manifold 130.

In the preferred embodiment, the flow meter consists of an axial flow turbine flow meter which produces 450 pulses per liter. A variety of different flow meters could be used.

Another input signal received by the pump controller 200 is a conductivity measurement value generated by POF conductivity cell 152.

Every washer 110–112 has a microprocessor-based local controller 210–212 and a sequence controller 214–216. The sequence controllers 214–216 are standard equipment on industrial and commercial washers. Each sequence controller 214 produces a sequence of output signals corresponding to a sequence of chemicals that are needed by the washer 110. Typically, these are simple "card" controllers which have a separate output line for each chemical used by the washer. An active signal is generated on each output line when the corresponding chemical is needed. When a washer's sequence controller 214 generates output signals indicating that the washer 110 is ready to receive a particular chemical, the local controller 210 sends a corresponding chemical request to the pump controller 200.

The local controllers 210–212 communicate with the pump controller 200 via a shared communication bus 220. Each local controller 210 is coupled to a diversion valve 160, a POD conductivity cell 166, and a washer's sequence controller 214. The local controllers 210–212 serve three primary functions: (1) controlling the position of the three-way valve, (2) reading conductivity measurements from the POD conductivity cell 166 and communicating those measurements to the pump controller 200, and (3) communicating chemical requests to the pump controller 200.

The operation of the diversion valves 160–162 is actually indirectly controlled by the pump controller 200. More particularly, one of the messages that the pump controller 200 can send over the bus 220 is a command to set the position of a specified one of the diversion valves 160–162.

Another message that the pump controller 200 can send over the bus 220 is a polling message directed at one of the local controllers 210–212. The specified local controller responds by sending a status message, as well as any chemical requests not previously sent to the pump controller 200. A more complete description of the messages sent between the pump controller 200 and the local washer controllers 210–212 is provided below in the discussion of FIG. 4.

Pump Controller

Referring to FIG. 2, the pump controller 200 is the central intelligence and control center for the chemical delivery system 100. The central processing unit CPU 240 is programmed to keep track of the status of the system, and to respond to requests for chemicals sent by the local controllers 214–216 over the communications bus 220. These procedures and how they implement the many features of the present invention are discussed below in the section entitled Pump Controller Process.

As noted above, the preferred embodiment of the system 100 can have up to nine chemical pumps. However, only one pump can be run at any one time. There are a few reasons for this restriction. First, it can be dangerous to mix reactive chemicals in a small confined space such as the manifold 130. Second, the system needs to accurately meter the amount of each chemical that is dispensed, and this can only be done by dispensing one chemical at a time. Third, the method of metering chemicals used in this system requires that the pumping rate of the transport pump 132 exceed the pumping rate of the chemical pump(s).

To activate a single selected chemical pump, a single motor driver 242 is coupled to a cascaded relay circuit 244. The cascaded relay circuit 244 has a series of N (up to nine) relays connected in series. Each relay can connect the output of the motor driver to a corresponding pump. Each pump has two input terminals: one connected to a common line, and one connected to the corresponding relay. The relays are connected so that the first enabled relay in the series connects the corresponding pump to the motor driver 242 and disconnects all the following pumps from the driver 242.

The cascaded relay circuit 244 is coupled to the pump controller's CPU 240 by a buffer 246 which stores and holds a separate ON/OFF control signal for each relay in the circuit 244.

The CPU 240 is coupled to the communication bus 220 by a standard serial transceiver circuit 250. Messages are sent between the pump controller 200 and the local controllers 210–212 using standard bit serial communications protocols.

An analog to digital converter (ADC) 252 couples the conductivity cell 152 to the CPU 240. In particular, the ADC 252 converts the analog signals generated by the conductivity cell 152 into digital conductivity values and transmits these values to the CPU 240.

For ease of reference, the conductivity cell 152 will sometimes be called the Proof of Flow or POF conductivity cell because this conductivity cell is used to confirm that chemicals flow through the manifold 130.

A temperature sensor 254 is placed in the proof-of-flow cell 152 in the preferred embodiment. The ADC 252 converts the analog signals generated by the temperature sensor 254 into digital temperature values and transmits these values to the CPU 240. The resulting temperature values are used by the CPU 240 to ensure that the water being used is sufficiently warm (e.g., at least 110° F.) to dissolve certain chemicals typically used in the preferred embodiment. In other words, some chemicals tend to gel at room temperature and thus clog the system unless warm water is used. If the water is not sufficiently warm after water has been pumped for a predefined period of time, a "water too cold" error message is generated. Similarly, if the water is too hot (e.g., over 150° F.) a "water too hot" error message is generated.

The pump controller 200 includes a user interface 260 with an LCD display, a printer port, and several buttons which can be pressed by users in order to access information stored in the CPU's memory 265. In addition, the printer port can be used as a connection interface for connecting a terminal to the CPU 240 for more extensive access to the data and programs stored in the CPU's memory 265.

Finally, an output buffer 262 stores and holds separate ON/OFF control signals for the water inlet solenoid 114, the transport pump 132, and an alarm relay 264. The alarm relay 264 is activated when the CPU 200 determines that a chemical container 102–106 is empty or detects any other error condition which requires immediate attention.

Local Controller

Figure 3:
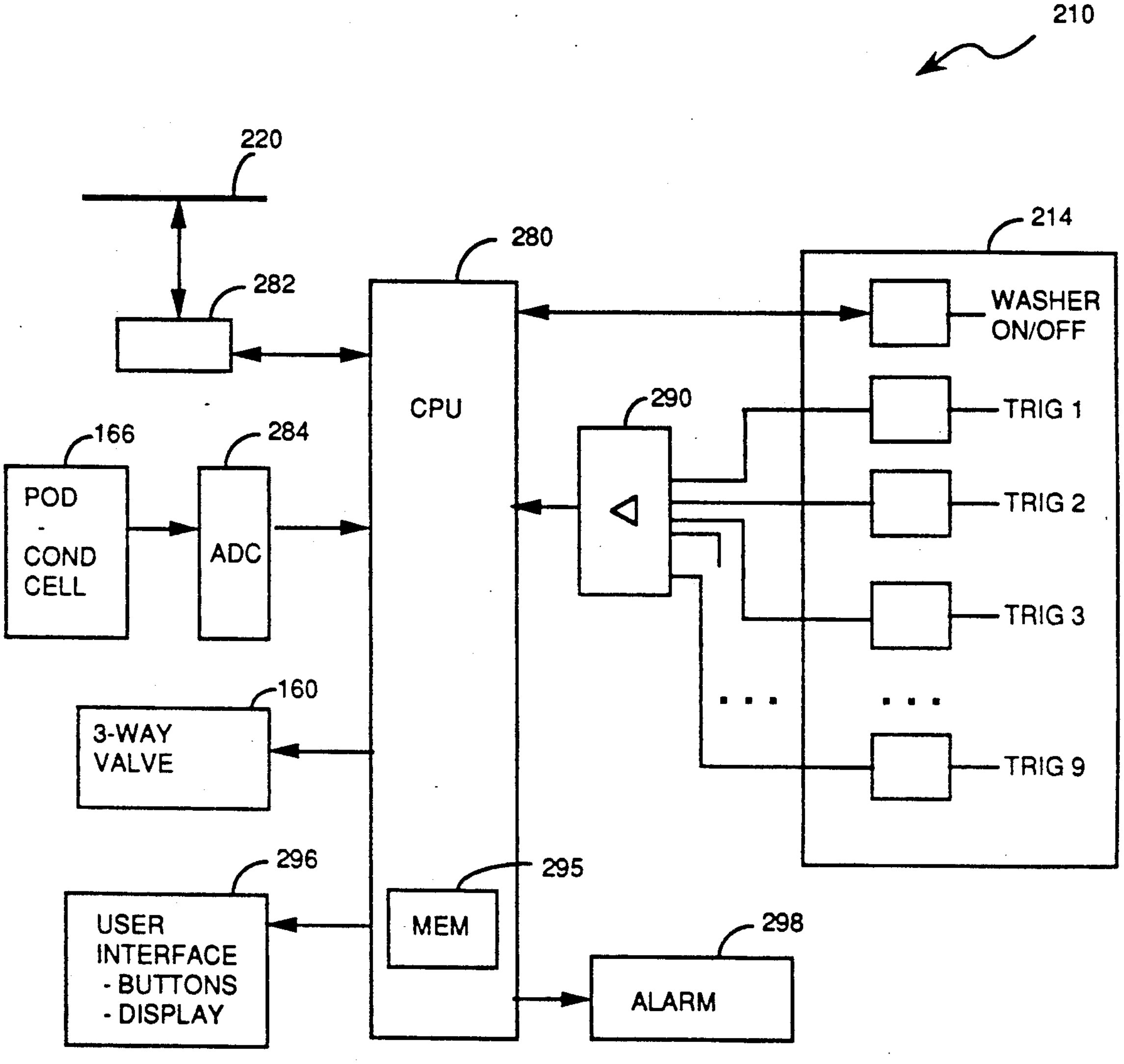
FIG. 3 is a block diagram of a chemical output port controller in the preferred embodiment.

Referring to FIG. 3, each local controller 210 contains a central processing unit (CPU) 280 which is programmed to keep track of the status of the corresponding washer 110, valve 160, and proof of delivery (POD) conductivity cell 166. The local controller 210 also receives signals from the washer's sequencer 214, and responds to polling messages from the pump controller 200 by sending status messages and requests for chemicals to the pump controller 200 via the communications bus 220. The CPU is coupled to the communication bus 220 by a standard serial transceiver circuit 282.

The local controllers 210 are sometimes herein called chemical output port controllers because they control the actions of the system at each output port.

An analog to digital converter (ADC) 284 couples the POD conductivity cell 166 to the CPU 280. In particular, the ADC 284 converts the analog signals generated by the POD conductivity cell 166 into digital conductivity values and transmits these values to the CPU 280.

The conductivity cell 166 is called the Proof of Delivery or POD conductivity cell because this conductivity cell is used to confirm that chemicals are actually delivered to the specified washer.

The sequence controller 214 produces several output signals, including a WASHER ON/OFF signal which indicates whether the washer is on or off, and one signal (TRIG1–TRIG9) for each of the chemicals that are used by the washer 110. The sequence controller 214 is coupled to the CPU 280 by an input buffer 290. The CPU 280 periodically reads all the signals generated by the sequence controller and updates an internal status array in memory 295 to reflect the values read. The local controller 210 can also turn the attached washer on and off via the WASHER ON/OFF line. It does this in response to washer hold and washer release commands sents by the pump controller 200.

The local controller 210 includes a user interface 296 with an LCD display and several buttons which can be pressed by users in order to access information stored in the CPU's memory 295. In addition, the user interface 296 includes a connection interface for connecting a terminal to the CPU 280 for more extensive access to the data and programs stored in the CPU's memory 295.

Finally, the CPU 280 is coupled to an audible alarm 298. The audible alarm 298 is activated when the CPU 280 detects an error condition which requires immediate attention.

Controller Messages

The chemical needs of several washers are generally serviced as follows. Each washer sends chemical requests to the pump controller 200 as it reaches the points in its cycle that require the delivery of chemicals. The pump controller 200 receives the chemical requests and then schedules the servicing of those requests in an efficient manner. In the preferred embodiment, all the chemical requests for a single washer are serviced before servicing the requests for another washer. This is done because the scheduling logic of the preferred embodiment must wait for the chemicals sent to one washer to be received before sending chemicals to another washer, while a sequence of chemicals to the same washer can be sent in quick succession without waiting for delivery of the earlier chemicals. In alternate embodiments of the invention, more complex scheduling logic could be used.

If too many requests are received in a short period of time, the operation of one or more of the washers may be suspended so that the requested chemicals will be delivered during the proper portion of each washer's wash cycle.

Figure 4:
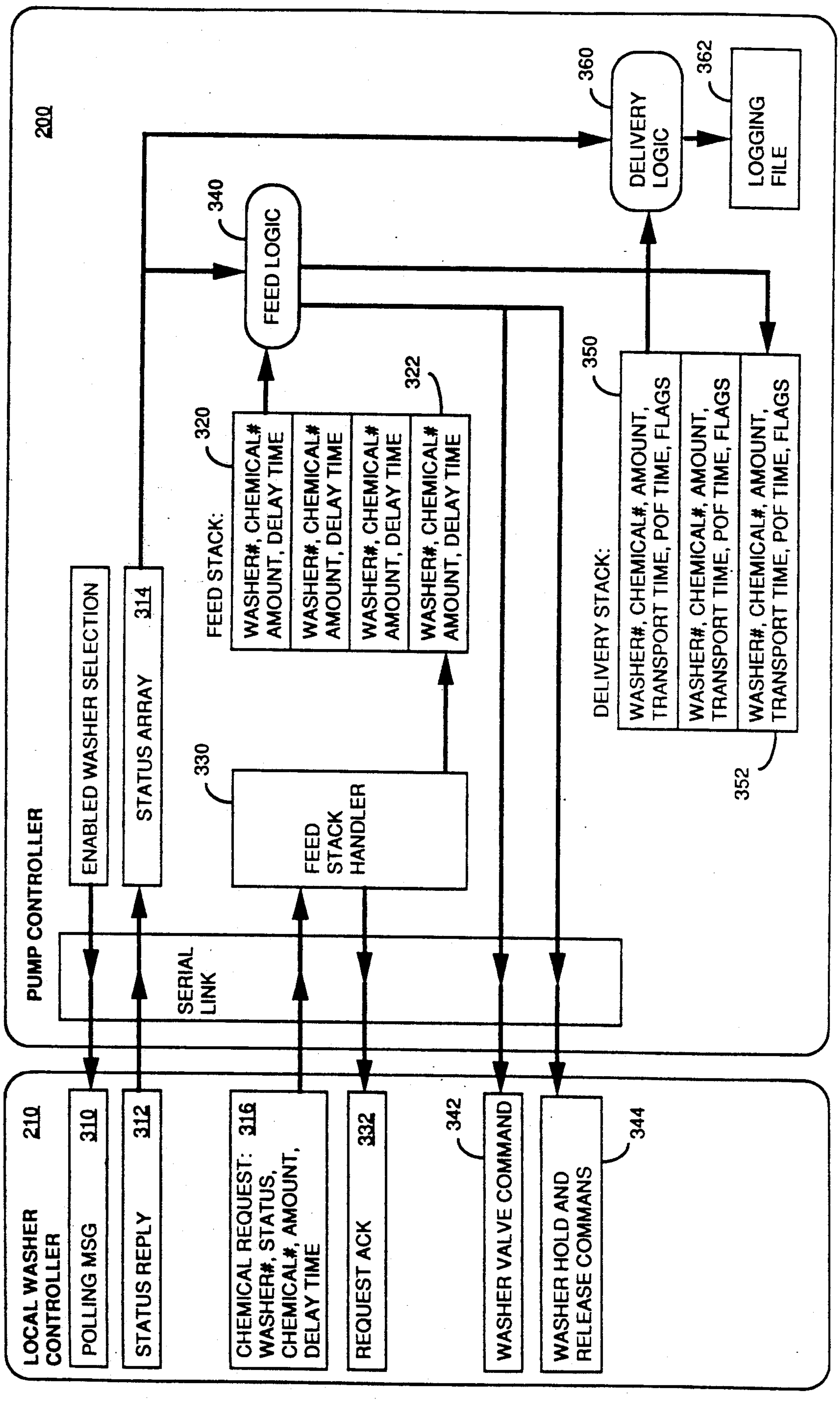
FIG. 4 schematically depicts messages sent between the pump controller and the chemical output ports, and related software and data structures.

Referring to FIG. 4, the pump controller 200 initiates all message exchanges with local controllers 210. In particular, the pump controller 200 sends a polling message eight times per second. The polling messages are sent in sequence to each of the local controllers. If there are eight washers, each local controller is polled once per second; if there are N washers the local controllers are polled once every N/8 seconds. The control program in the pump controller 200 can send polling messages to eight different "washer addresses", but only sends polling messages to "enabled washers"—which means to the local washer controllers that have been connected to the communication bus 220 and are known to the pump controller 200.

Status Reply Message

The local controller 210 responds to a polling message by sending a status reply message 312. The contents of a status reply message are as follows:

(1) the washer's address or identifier (one byte), (2) the current position of the three way valve 160 coupled to this local controller (i.e., "bypass" or "feed"), (3) a washer ON/OFF bit flag which indicates whether the washer is on or off, and (4) a conductivity HI/LOW bit flag which indicates whether a chemical solution is currently passing through the local POD conductivity cell 166.

Note that the local controller uses conductivity measurements from the local POD conductivity cell 166 only to see if there is a sufficient conductivity differential from the conductivity of plain water to indicate the presence of a chemical solution.

The information in the status reply message is stored by the pump controller 200 in a status array 314, which contains one status record for each washer in the system.

Chemical Request

Whenever the sequencer 214 coupled to the local controller 210 generates an actiVe signal on one of its output lines, the local controller 210 sends a corresponding chemical request 316 to the pump controller. The information in a single chemical request 316 is as follows:

(1) a chemical identifier, which is a predefined number associated with the chemical needed by the washer, (2) the amount of chemical needed, specified as a four digit quantity in units of milliliters (i.e., an amount between 00.00 and 99.99 liters), and (3) a delay time, specified as a two-byte integer in units of seconds.

Several chemical requests 316 can follow a single status reply message. Two or more chemical requests are sometimes included in a single message when the sequence controller simultaneously generates active signals for two or more chemicals.

Each local controller 210 is programmed to convert signals on the sequencer's output lines into a chemical request with the above parameters. The local controller is "programmed" by entering appropriate values into a table using the local controller's user interface 296. More specifically, for each sequence controller line, one enters a chemical number, and then specifies a quantity and delay time for each successive occurrence of a signal on that line in a single washer cycle. Chemical quantities can be specified in either milliliter units or ounce units. If ounce units are used, the amount is internally converted into 10 milliliter units.

Delay times are traditionally used in prior art systems to ensure that there is water in the washer before chemicals are dispensed, because concentrated chemicals can harm clothing and linens. Delays are generally not needed when using the present invention because the dispensed chemicals are diluted and therefore will not harm clothing and other articles in the washers. However, delay times may be specified if the user wants to mimic the operation of a prior art system, or has some other reason for wanting to delay the delivery of a chemical.

Feed Stack

Chemical requests received by the pump controller 200 are initially stored in a data structure called the Feed Stack 320. Each chemical request received is stored as a new record 322 at the end of the Feed Stack 320 by a Feed Stack Handler routine 330. The Feed Stack Handler routine 330 also sends a request acknowledgement message 332 back to the local controller 210. The request acknowledgement message 332 basically repeats the information in the chemical request(s) sent by the local controller 210 so that the local controller 210 can confirm that the pump controller 200 properly received its request. If a request is either not acknowledged or corrupted information is found in the request acknowledgement message 332, the chemical request is repeated the next time that the pump controller polls the local controller 210.

In addition, it should be noted that if the quantity of chemical needed by a washer exceeds the amount that can be specified in a single chemical request 316, one or more additional chemical requests are generated which specify additional amounts of the same chemical. The Feed Stack Handler routine 330 processes such requests by increasing the amount of chemical denoted in the previously stored Feed Stack record 322.

The Feed Stack Handler routine 330 also sorts the records in the Feed Stack 320 so that all the records for each washer are clumped together, and so that the records with the smallest delay time are at the top of the Feed Stack 320. The records are sorted in this way to promote fast and efficient delivery of chemicals. By sorting the Feed Stack records in this way, an early request with a large delay time will not block the processing of a chemical request with a shorter delay time. Also, all the chemicals requested by a single washer will be sent in succession. As will be explained below, a longer "flush" time is needed between chemical deliveries for different washers than between successive chemical deliveries to a single washer, and therefore it is most efficient to send all the chemicals requested by one washer before sending chemicals to another washer.

Washer Valve Command

A Feed Logic routine 340 processes entries in the Feed Stack 320 one at a time. To do this it first sends a washer valve command 342 to the washer's local controller 210 to set corresponding diversion valve 160 to the "feed" position. Then a preflush cycle is run, and then chemicals are pumped through the distribution tube 150 and into the washer Which requested the chemical. A washer valve command 342 for setting the diversion valve 160 back to the "bypass" position is not sent until all the chemicals for the specified washer have been delivered.

Washer valve commands 342 do not need to be separately acknowledged because the pump controller will automatically check on the valve's position the next time that a polling request is sent to the washer. If the valve position reported in the next status reply does not match with the valve position specified in the washer valve command, the washer valve command is retransmitted. However, in an alternate embodiment, an explicit acknowledgment message can be sent by the local controller 210 upon receipt of a washer valve command 342.

Washer Hold/Release Command

The Feed Logic program 340 periodically reviews all the records in the Feed Stack 320 to determine whether there are any "scheduling conflicts". That is, it looks to see if there are any chemical requests which cannot be satisfied within a reasonable period of time. Scheduling conflicts typically occur when all the washers are running and there is a coincidence of overlapping chemical requests. In a fully loaded system with eight washers running all day, such scheduling conflicts may arise several times per day. To handle such scheduling conflicts, the Feed Logic program 340 sends "washer hold" commands 344 to any washers for which a chemical request cannot be serviced with a predefined amount of time. The washer hold command 344 is received by the local controller, which then shuts down its washer until a washer release command is received. A washer release command 344 is sent by the Feed Logic program 340 when the Feed Logic program processes a chemical request for a previously stopped washer. The use of washer hold and release commands 344 prevents chemicals from being delivered to a washer too late during its wash cycle.

Delivery Stack

Whenever the Feed Logic program 340 completes the processing of a chemical request, by putting the requested amount of the specified chemical into the distribution line, it moves the chemical request record into a data structure called the Delivery Stack 350. Thus each record 352 in the delivery stack represents a "slug" of chemical solution that has been fed into the distribution line, but which has not yet been completely received by the washer which requested it. Each Delivery Stack record 352 specifies:

(1) the washer to which the chemical is being sent, (2) the amount of the chemical fed into the distribution tube 150, (3) the transport time, which is the amount of time that has passed since the specified chemical was first fed into the manifold 130, (4) the Proof of Flow time (POF Time), which is the amount of time that it took to add the chemical into the manifold, and is roughly equal to the "length" of the chemical slug in the distribution tube measured in seconds, and (5) several flags including:

(A) a Feed Error flag, which indicates whether an error occurred during the process of adding the chemical to the manifold (such as running out of the chemical), (B) a Delivery Error flag, which indicates whether the chemical was received at the specified washer, and (C) a Preflush Error flag, which indicates whether the manifold was successfully cleared of all chemicals before the specified chemical was added to the manifold.

A Delivery Logic routine 340 processes the entries 352 in the Delivery Stack 350. In particular, it reviews the conductivity ON/OFF flags in the status replies sent by the local controllers and then determines whether each of the chemicals fed into the distribution tube have been received. When the chemical is received, or the maximum amount of time required for delivery has passed and the chemical has not been received, the corresponding record 352 in the Delivery Stack 350 is removed from the stack 350 and stored in a logging file 362.

Chemical Delivery Sequence

Figure 5:
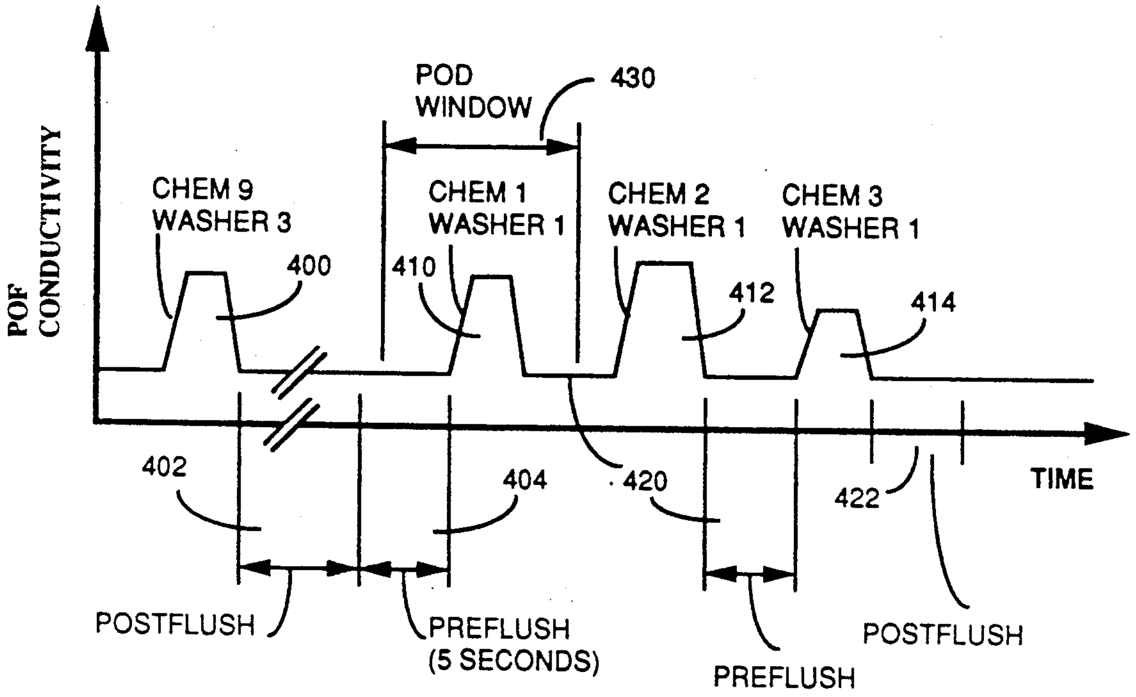
FIG. 5 is a timing diagram showing the timing of a sequence of chemical deliveries.

Referring to FIG. 5, there is shown a timing diagram for a typical sequence of chemical deliveries. Note that this is only an example of one possible sequence of events, and that many other sequences will occur in the actual system.

FIG. 5 charts the conductivity measured by the POF conductivity cell 152 in the manifold 130 over a period of time. The first event 400 shown is the feeding of "chemical 9" into the manifold 130 for delivery to "washer 3". In this particular example, after the feeding of chemical 9 into the manifold is completed, no more chemicals are being sent to washer 3, at least not immediately. Instead, a sequence of three chemicals will be send to "washer 1".

In the preferred embodiment, the last chemical delivery event to each washer is followed by a postflush cycle 402. Since chemical feeding event 400 is the last feed event to this particular washer, it is followed by a "postflush" cycle 402. During each postflush cycle 402, 422, the manifold 130 and the distribution line 150 are flushed with plain water until the proof of delivery cell reports the receipt of the dispensed chemical.

Every chemical feeding event is preceded by a five-second "preflush" cycle 404, 420. That is, in addition to any postflush cycle that may have been performed, the manifold 130 and distribution line 150 are flushed with plain water for five seconds before each chemical feeding events.

As shown in FIG. 5, three chemical feeding events 410, 412 and 414 send slugs of chemical 1, chemical 2 and chemical 3 down the distribution line 150. Each chemical feeding event is preceded by a five second preflush cycle 420. The last chemical feeding event to washer 1 is followed by a postflush cycle 422.

From the viewpoint of the local controller for washer 1, there is a period of time, herein called the proof of delivery window or POD Window 430, during which each chemical should arrive at the washer. The beginning and end of the POD Window 430 are defined in terms of (1) the standard transport time from the manifold to the washer, and (2) the amount of the chemical sent as specified by the POF time (i.e., the amount of time it took to pump the chemical into the manifold).

During the POD Window 430, the pump controller's Delivery Logic routine periodically checks the conductivity HI/LOW signal at the local POD conductivity cell. In order to confirm successful delivery of a chemical to a washer, the Delivery Logic must see a HI POD conductivity signal for a period of time that is comparable to the POF time of the chemical feed event. Since the edges of the chemical slug will tend to spread out, causing the conductivity at the edges of the pulse to fall, the criteria in the preferred embodiment is that the POD conductivity cell must report a HI signal for a length of time that is at least 80% to POF time. Other definitions may be used in alternate embodiments, such as 85% of the POF time minus two seconds.

The beginning of the POD Window starts about 2.5 seconds before the expected arrival of the chemical at the washer, and ends about 2.5 seconds after the chemical should have been completely delivered to the washer. Each slug of chemical in the distribution line may spread out somewhat as it travels through the distribution line 150. It is for this reason that the POD Window provides a margin around the expect arrival time of each chemical.

As stated above, in the preferred embodiment, all the chemical requests for a single washer are serviced before servicing the requests for another washer. This is done because the scheduling logic of the preferred embodiment requires the chemicals for one washer to be received before sending the chemicals for the next washer, while a sequence of chemicals to the same washer can be sent in quick succession without waiting for delivery of the earlier chemicals. In alternate embodiments of the invention, more complex scheduling logic could be used. This alternate scheduling logic would dispense the chemicals for the next washer into the distribution tube, without waiting for all the chemicals to be delivered to the previous washer, whenever the "next washer" is further down the distribution line 150 than the previous washer. Using this logic, the appropriate washer valve commands would need to be sent almost immediately after proof of delivery of chemical to one washer so as to prevent the incorrect delivery of chemicals. When the "next washer" is closer to the manifold than the "previous washer", the alternate scheduling logic would still need to wait for delivery of the dispensed chemicals to the previous washer before dispensing chemicals to the next washer.

Pump Controller Process

Next, we will describe the details of the process used by the pump controller 200 in preferred embodiment. This will be done first from the viewpoint of how certain features of the present invention work, and then from the viewpoint of the actual sequence of steps of the control process.

Chemical Metering, Automatic Pump Priming and Calibration

Calibration of the chemical metering pumps 142–146 in the present invention works as follows. Basically, if the flow rate of the transport pump 132 is known, and the rate at which water flows through the water meter 120 is known, then any differential between these two rates is the flow rate of whichever chemical metering pump is currently running. For each chemical metering pump, the system software stores a "calibration factor", which is equal to the flow rate of the pump. The calibration factor for each chemical metering pump is recomputed every time that the pump is used. The computed flow rate of the chemical metering pump is equal to the flow rate of the transport pump 132 minus the flow rate of water, as measured by the water flow meter 120. To prevent large fluctuations in the calibration factor, the computed flow rate is averaged with the existing pump calibration factor using a weighted average.

In the preferred embodiment, the flow rate of the transport pump 132 varies very little (less than three per cent) with variations in the back pressure on the pump 132 from the distribution line 150. Nevertheless, since we want accurately dispense the specified amount of each chemical, the flow rate of the transport pump is measured periodically. In particular, the flow rate (i.e., fluid flow per second) of the transport pump is recomputed at the end of each preflush cycle. Each newly computed transport pump rate is averaged with the prior transport pump using a weighted average so that the calibration of the transport pump is adjusted by at most a small amount each time.

Each time that a chemical is dispensed, the specified amount of chemical is fed into the manifold 130 as follows. First, the chemical metering pump is run until the presence of chemical is detected by the conductivity cell 152. This is called autopriming, because the chemical pump is run until it is primed (i.e., ready to dispense chemical). There is a predefined maximum autopriming time that the chemical pump will be run without seeing an active conductivity signal, equal to about thirty seconds in the preferred embodiment. If no chemical is detected by the conductivity cell in that time, the chemical container for that chemical is probably either empty or missing, and an appropriate error message is displayed on the user interface 260 and the system's main alarm 264 is activated.

Once the presence of chemical in the manifold 130 is detected, the chemical metering pump is run for a period of time which is equal to the specified amount of chemical divided by the stored calibration factor (i.e., flow rate) of the pump.

In an alternate embodiment of the invention, chemical quantities are metered using a real time flow differential computation. In particular, the chemical metering pump is run until the differential between the amount pumped by the transport pump 132 (as calculated using the last calculated value for the flow rate of the transport pump) and the amount of water fed into the manifold 130 through the water meter 120 equals the specified chemical amount.

Using either of the above chemical dispensing methods, the Proof of Flow Time (POF Time) for a chemical feed event is the amount of time that it takes the chemical metering pump to dispense the specified amount of chemical into the manifold. That is, the POF time is the amount of time that the chemical metering pump is run after autopriming. The POF Time is stored in the Delivery Stack record 352 for the chemical feed event.

Back Pumping

After each chemical feed event the specified chemical pump is run in reverse for a short period of time so as to pull water back into the tube which runs through the pump. More specifically, the peristaltic pump is run in reverse just long enough to pull water into the mechanically worked portion of the pump's tube, but not so long as to pump water into the chemical container 102. The result is that the pump tube is not exposed to chemical for most of its life. Even in systems in which the system is run at full capacity 24 hours per day, this back pumping feature will normally result in water being in the mechanically worked portion of the pump tube at least 23.5 hours per day. This feature increases the typical useful life of the pump tube from about three months to about a year, at which point accumulated mechanical stress requires replacement of the tube. This same technique can be used with chemical metering pumps other than peristaltic pumps, whereby the pump is run in reverse after each chemical feeding event so that the pump is not exposed to chemical between chemical feeding events.

Automatic Tube Maintenance Indicator

Each time that a chemical pump is used, the Feed Logic routine computes the flow rate of the chemical metering pump. The computed flow rate is compared with a predefined "normal" rate for the pump (which is the flow rate of the pump when the pump tube is new). When the measured flow rate decreases from the predefined normal rate by more than a specified amount (20% in the preferred embodiment), the system generates a message on the user interface 260 and on the system's printer indicating that the pump tube is probably about to fail. This feature helps to schedule preventative maintenance and helps to prevent pump tube failures during the middle of normal system operation.

If a pump tube nevertheless breaks, no chemical will be thereafter be fed into the manifold. A broken pump tube generally causes the transport pump to draw air into the manifold instead of water. Thus a broken pump tube is detected by detecting that the water flow meter 120 is not registering the flow of water while the transport pump is running. Upon detecting a broken tube, the Feed Logic routine generates an alarm as well as a "broken pump tube" message on the user interface 260.

The flow meter 120 serves many purposes in the preferred embodiment. It is used to verify that there is water in the break tank 116, and that the water supply remains adequate while the system is running. The flow rate measured by the flow meter 120 is also used to verify that the transport pump 132 is working properly and that the distribution tube remains unobstructed. Furthermore, as mentioned above, the flow meter 120 is used to calibrate the flow rates of the transport pump 132 and the chemical metering pumps.

Main Pump Controller Routine

Figure 6:
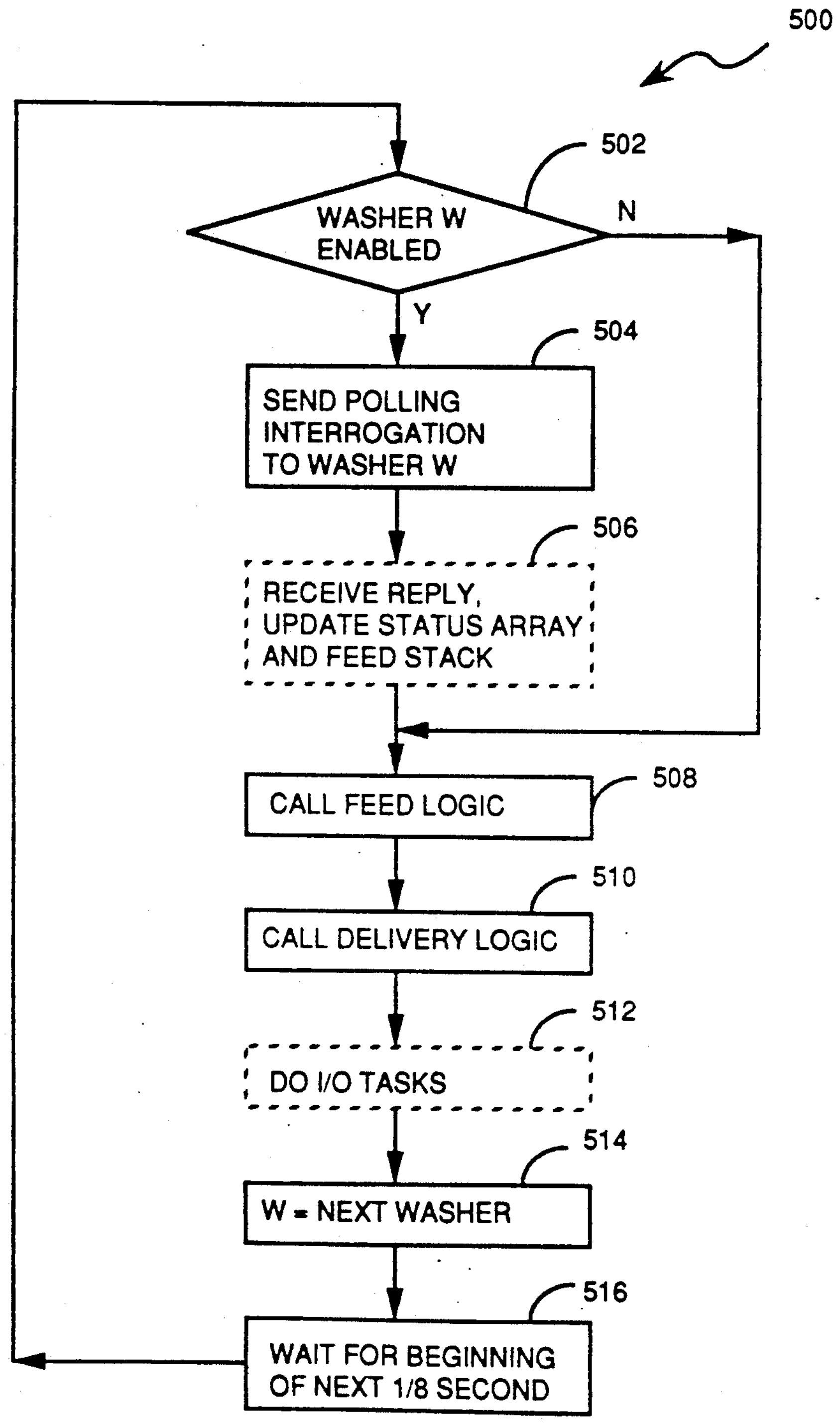
FIG. 6 is a flow chart of the process used by the pump controller of the preferred embodiment.

Referring to FIG. 6, there is shown a flow chart for the main routine 500 run the pump controller's CPU 240. The main routine runs through the steps shown in FIG. 6 eight times per second.

The preferred embodiment can handle up to eight washers which are herein labelled WASHER 1 through WASHER 8. However many systems using the preferred embodiment will have less than eight washers.

If a particular WASHER W (where W is a value between 1 and N, and N is the number of washers in the system) is enabled (i.e., is known to the system's software) (box 502), the main routine first sends a polling message to WASHER W (box 504). The local controller for WASHER W will respond by sending back a reply, comprising a status reply and possibly one or more chemical requests. An interrupt routine (box 506) receives this reply and then updates the status array 314 and Feed Stack 320 with the information in the received reply. In particular, whenever a chemical request is received the main routine calls the Feed Stack Handler routine, discussed with reference to FIG. 4.

The Feed Stack Handler routine not only adds a new record to the Feed Stack 320 for each new chemical request (unless the request only adds to the amount of chemical specified in a previous request), but it also sorts the records in the Feed Stack 320. See the above discussion of the Feed Stack Handler routine.

Eight times each second the main routine 500 calls the Feed Logic routine 340 (box 508) and then the Delivery Logic routine 360 (box 510).

Generally, the Feed Logic routine 340 processes the record at the top of the Feed Stack. The Feed Logic routine is discussed below in detail with reference to FIG. 7.

The Delivery Logic routine 340 processes the record at the top of the Delivery Stack and tries to confirm delivery of the specified chemical to the specified washer. The Delivery Logic routine 360 is discussed below in detail with reference to FIGS. 8A–8C.

A periodic timer initiated interrupt routine (box 512) performs certain input/output tasks (including reading the conductivity meter, reading the temperature sensor 254 in the break tank, responding to buttons pushed on the user interface 260).

Finally W is set to the identifier for the next washer (box 514), and the main loop is repeated at the beginning of the next ⅛ second time period (box 516).

Feed Logic Routine

Figure 7:
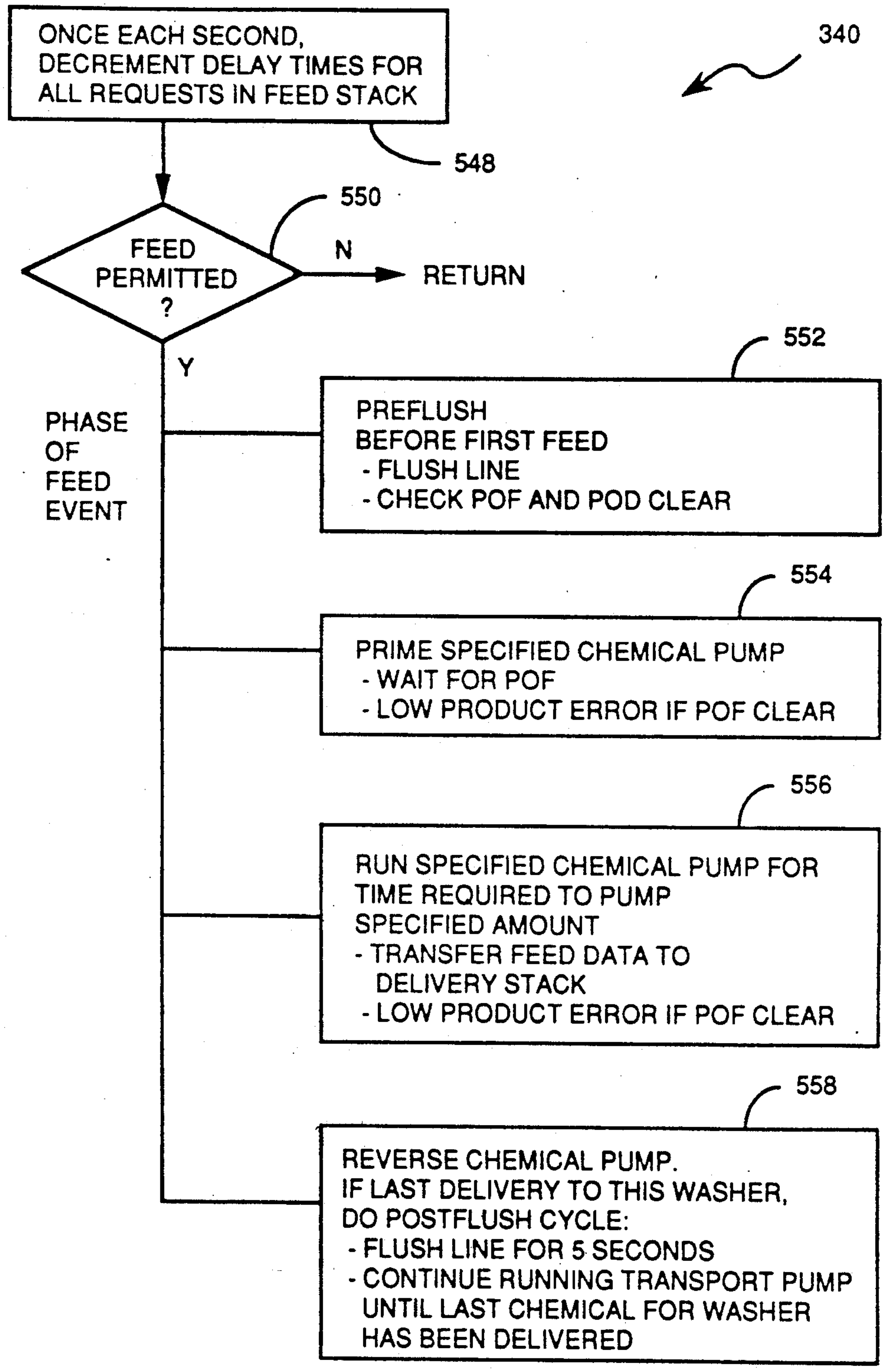
FIG. 7 is a flow chart of the chemical pumping process used by the pump controller.

Referring to FIG. 7, there is shown a flow chart of the Feed Logic 340 routine used by the pump controller. One time per second the Feed Logic routine decrements all the delay times for the requests pending in the Feed Stack (box 548), although no delay times are decreased below zero.

Next, the Feed Logic routine exits (box 550) if no feed events are currently permitted. No feed events are currently permitted (a) if there are no records in the feed stack with a delay time of zero, or (b) if the washer specified by the records at the top of the feed stack is different from the washer to which the last chemical feed was sent and that chemical feed has not yet been received. In other words, new chemicals for a new washer cannot be pumped into the distribution line 150 until the chemicals previously pumped into the distribution line for a different washer have been received. One reason for this requirement is that only one washer's three-way valve can be in the "feed" position at any one time.

If a feed is permitted, the Feed Logic performs one of four basic functions depending on the phase of the feed event which is occurring. The first phase is call the preflush cycle (box 552). If the Feed Stack record being processed specifies that a chemical is to be sent to a different washer than the washer to which the last chemical was sent, a preflush cycle is executed (box 552). The purpose of the preflush cycle is to ensure that all chemicals are flushed from the manifold 130 and that there is a separation in the distribution tube 150 between chemicals.

Just before each preflush cycle the diversion valve for the specified washer is set to the "feed" position, all the other diversion valves 160 in the system are set to the "bypass" position, and none of the chemical pumps are enabled. As preflush begins, and the transport pump is enabled. This causes water to be pumped through the distribution line 150 and into the specified washer.

During each preflush cycle, both the POF conductivity cell 152 and the POD conductivity cell at the specified washer are checked to make sure that no chemicals are in the distribution line 150. The standard preflush cycle lasts for five seconds. However, if an active conductivity signal is received from either the POF or POD conductivity cells, there are chemicals still in the distribution line 150 and therefore the preflush cycle is extended.

However, the manifold and distribution line cannot be flushed indefinitely. If the POF and POD conductivity cells do not both become inactive within a predefined period of time (e.g., thirty seconds), the feed event proceeds despite the apparent contamination of the distribution line 150. It is assumed that the contamination in the line has been minimized by the extended preflush. In an alternate embodiment the pump controller's alarm is activated, and a "contaminated distribution line" error message is displayed, indicating that the distribution line to be contaminated with chemicals.

The second phase of the Feed Logic routine is priming the selected chemical pump (box 554). As described above, the specified chemical pump is primed by running the pump until the POF conductivity cell 152 becomes active, denoting the presence of chemical in the manifold 130. If the POF conductivity cell remains inactive for a predefined period of time, the container for the specified chemical is either missing or empty, or the pump tube for the chemical has broken. In any case, the pump controller's alarm is activated and a "low product" error message is displayed on the user interface 260.

The third phase (box 556) of the Feed Logic routine is running the specified chemical pump to feed the specified amount (i.e., specified by the Feed Stack record) of the chemical into the manifold. This is done using the automatic metering method described above.

At the end of the third phase, the feed data including the Proof of Flow time is stored in a new record at the end of the Delivery Stack. The new Delivery Stack record denotes a transport time equal to the amount of time that has passed since the specified chemical first entered the manifold. The Delivery Stack record also includes a Preflush error flag and a POF error flag which indicate whether any errors occurred during the preflush and chemical pumping phases of the chemical feeding process.

In the fourth phase (box 558) of the Feed Logic routine the specified chemical pump is run in reverse just long enough to pull water into the pump (i.e., the mechanically worked portion of the pump's tube), but not so long as to pump water into the chemical container. This is done so that the pump (i.e., the pump tube) is not exposed to chemical for most of its life.

During the fourth phase the transport pump continues to run and pump water through the distribution line 150. If the feed event being processed is to be followed by another feed event to the same washer, the next preflush cycle (box 552) lasts five seconds and then the Feed Logic routine starts processing the next feed stack record at box 554 (autopriming). Note that if the feed event being processed is sending a chemical to the same washer to which a chemical was sent during the previous feed event, no postflush cycle is performed.

If the feed event being processed is the last to send a chemical to the specified washer, then the Feed Logic routine does not shut off the transport pump 132. Instead, the Feed Logic routine starts a postflush cycle by leaving the transport pump 132 on. The Delivery Logic routine handles the termination of the postflush cycle. In particular, the Delivery Logic routine keeps the transport pump 132 running until the chemical has been delivered to the specified washer, and then keeps the transport pump 132 running until the POD cell at the specified output port detects plain water for five seconds. Thus, when a feed event is the last one to a particular output port, the Delivery Logic routine shuts off the transport pump 132 at the appropriate time.

Delivery Logic Routine

Figure 8A:
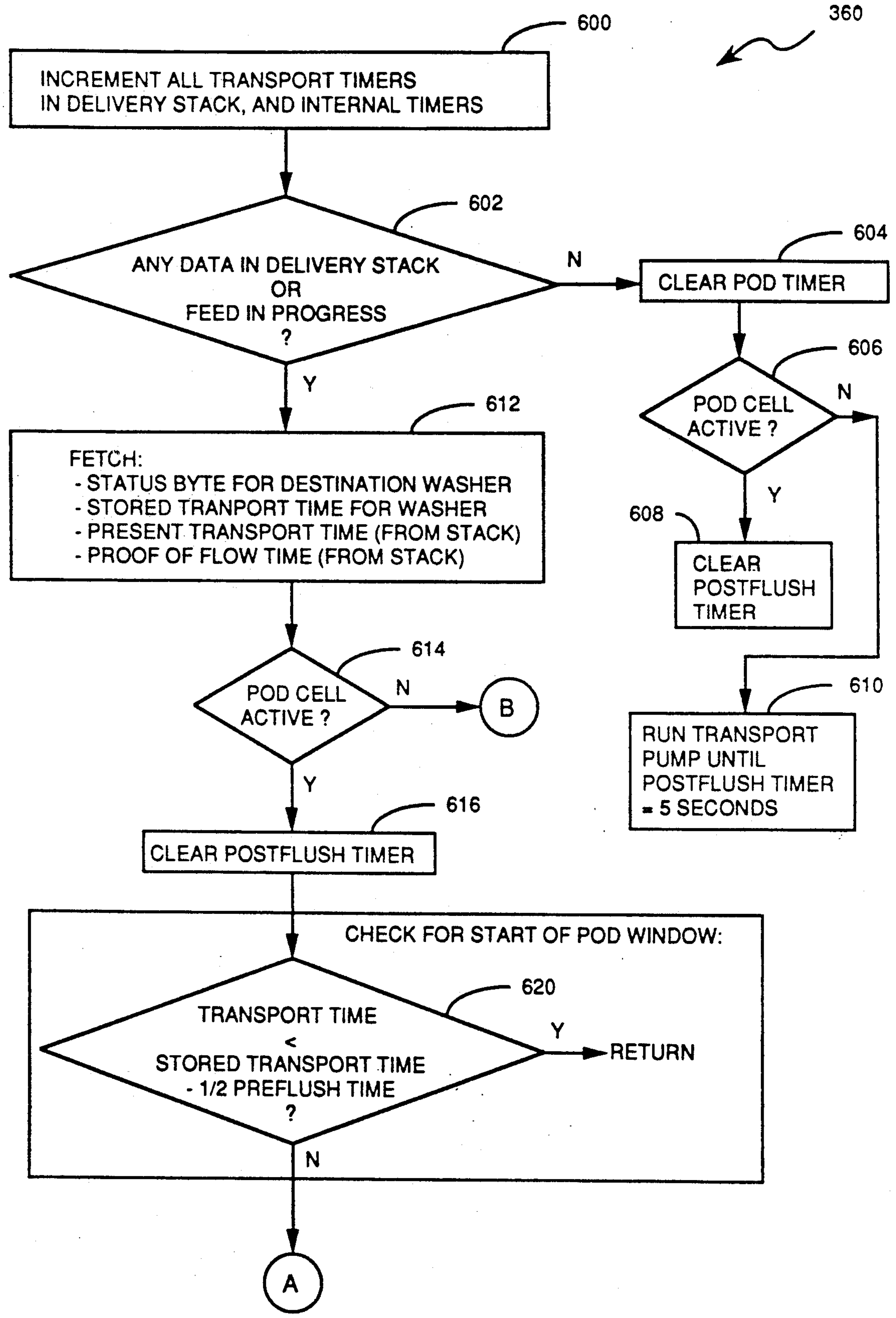
FIGS. 8A, 8B and 8C are a flow chart of the process used by the pump controller to confirm delivery of each chemical at its specified output port.
Figure 8B:
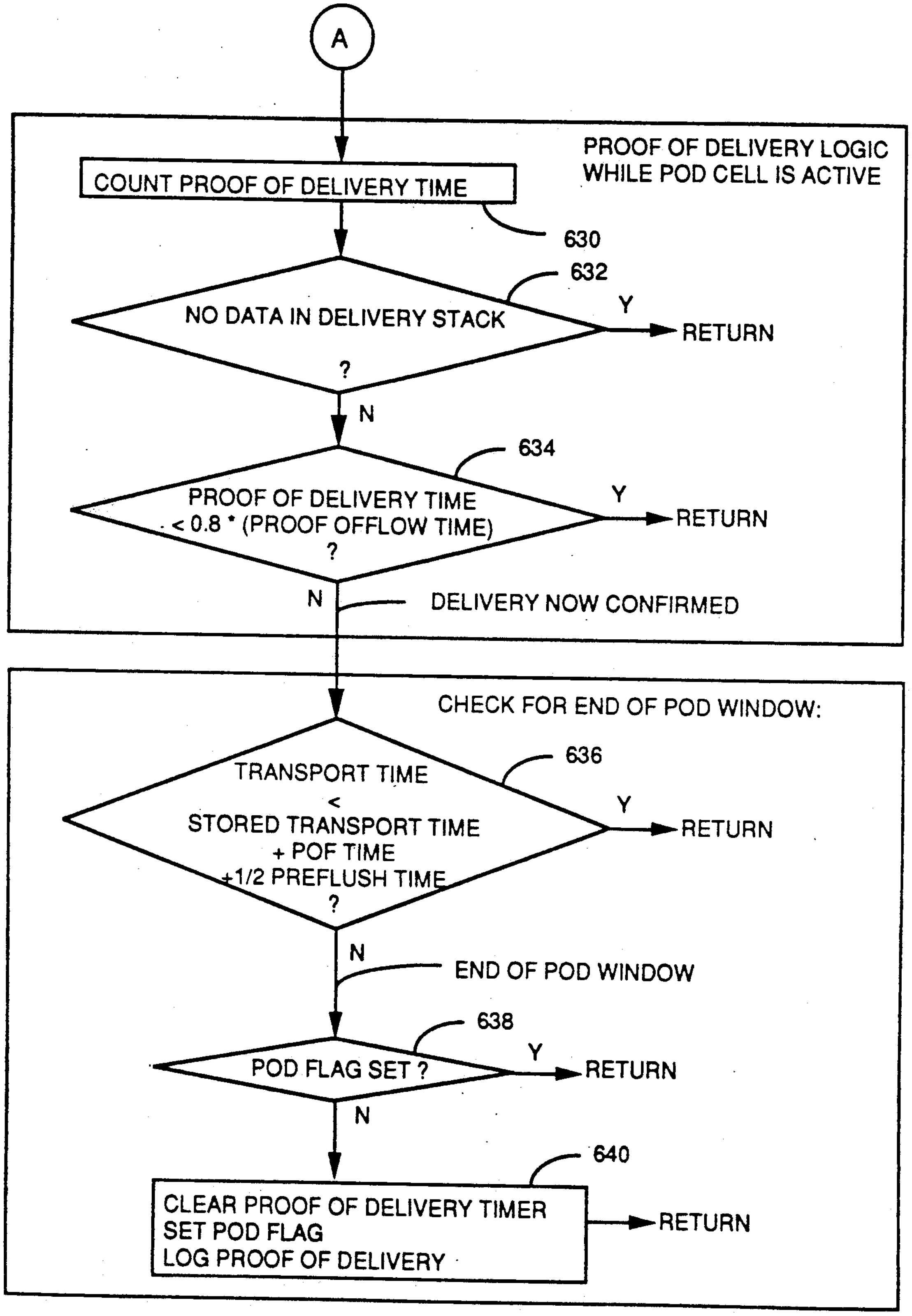
Figure 8C:
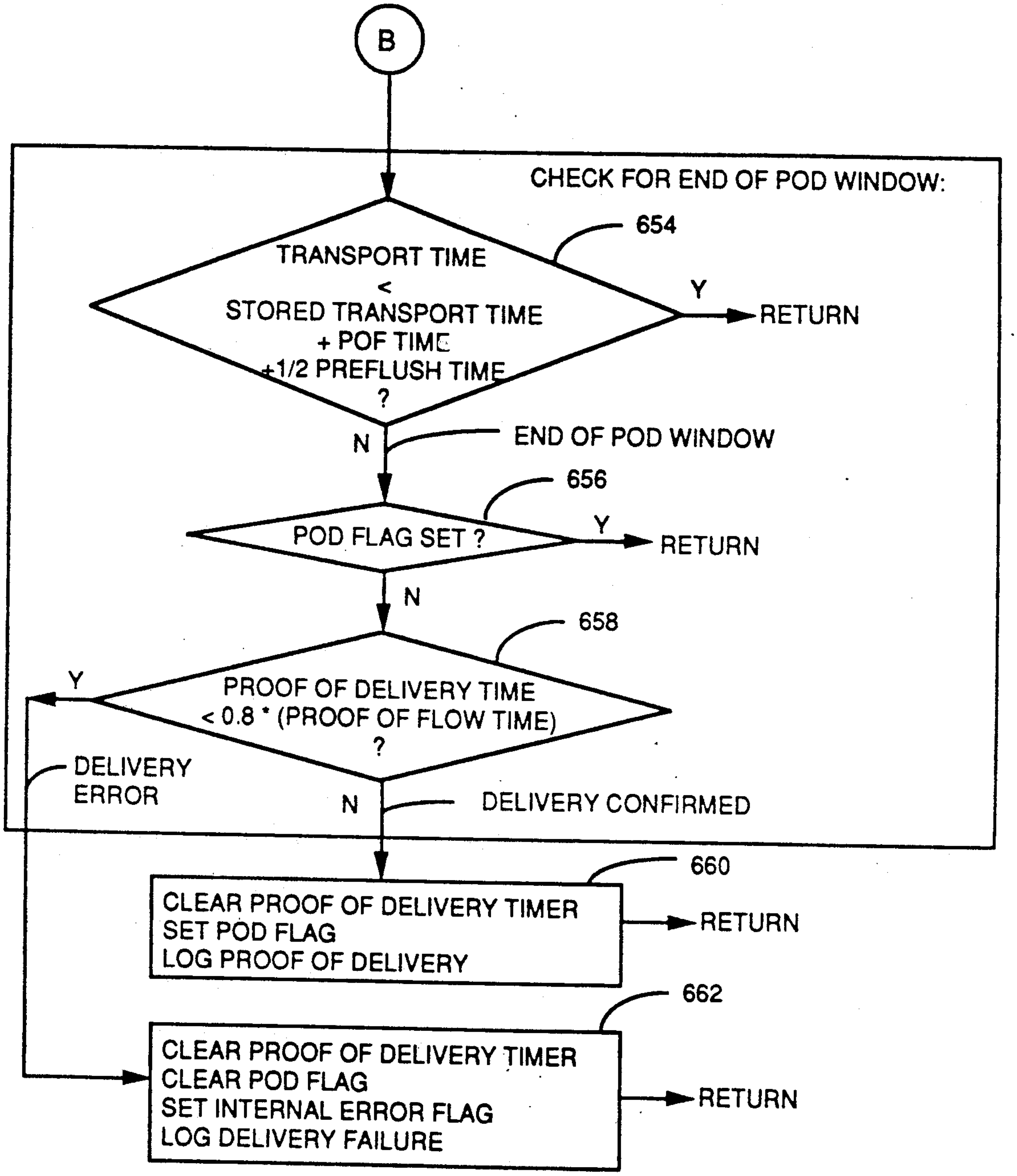

Referring to FIGS. 8A, 8B and 8C there is shown a flow chart of the Delivery Logic routine 360 used by the pump controller to confirm delivery of each dispensed chemical at its specified output port. Each time that the Delivery Logic routine is run it increments all the transport timers for the feed event records pending in the Delivery Stack (box 600).

It should be noted that this routine 360 uses a number of "internal timers". These timers are software timers which are automatically updated eight times per second (box 600), and which can be cleared by the routine in order to time the length of various phases of a feed event. For instance, there is a postflush timer for measuring the duration of a postflush cycle. Other internal timers, such as a POD timer for measuring the amount of time that the POD cell at a washer is active, are incremented only under certain conditions as is explained below.

After incrementing the transport timers in the Delivery Stack and the routine's internal timers, the Delivery Logic routine checks to see if there are any records in the Delivery Stack or if any feed events are in progress (box 602). It is important to note that a chemical may begin to arrive at a specified washer before the feed event has terminated, especially if the washer is close to the manifold 130 and a large amount of chemical is being delivered. Thus the Delivery Logic routine must handle the situation in which there are no records in the Delivery Stack but a feed event is in progress.

If there are no records in the Delivery Stack and no feed events are in progress (box 602), the POD timer (used by the routine for verifying the delivery of chemicals) is cleared (box 604). If the POD cell at the specified washer is active (box 606), the postflush timer is cleared (box 608) and then the routine exits. Otherwise, if the POD cell at the specified washer is not active, the transport pump is allowed to run until the postflush timer reaches a value of five seconds (box 610).

If there are any records in the Delivery Stack or if any feed events are in progress (box 602), the Delivery Routine fetches the status information for the specified washer (box 612). It also fetches the "stored transport time" for the washer—which is the standard or nominal amount of time that it takes liquid to travel from the manifold to the specified washer. It also retrieves the top record in the Delivery Stack so as to have access to the current value of the Transport Time (which is the amount of time that has passed since the specified chemical was first fed into the manifold 130) and the Proof of Flow Time.

Next, if the POD cell at the specified washer is active (box 614), the postflush time is cleared (box 616), and then the routine checks to see if the feed event has entered the beginning of the POD window (box 620). See the timing diagram in FIG. 5 and the above description of the POD window. Technically, the Delivery Logic routine tests for the beginning of the POD window by comparing the current Transport Time with the Stored Transport Time minus half the Preflush Time. Since the Preflush Time is five seconds, the POD window begins 2.5 seconds before the expected arrival of the specified chemical at the washer. If the feed event has not yet entered the POD window (box 620), the routine exits. Otherwise, if the POD window has been entered, the routine continues at reference point A at the top of FIG. 8B.

Note that the POD cell is active at this point in the routine, and that we are in the POD window. Thus, at this point the POD Time is incremented (box 630).

If the Delivery Stack is empty (box 632), there is no other work to do at this point and the routine exits.

Next, if the POD Time is less than 80% of the POF Time for the feed event, the routine exits because not enough chemical has yet been received to confirm delivery (box 634). If the POD Time is at least 80% of the POF Time, delivery of the specified chemical is considered to be confirmed and the process moves onto the next step (box 636).

At box 636 the routine determines whether we are at or past the end of the POD window. We are still in the POD window if the Transport Time is less than the Stored Transport Time plus the POF Time, plus half the Preflush Time. Thus the POD window ends 2.5 seconds after the expected completion of the delivery of the specified chemical. If we are still within the POD window the routine exits.

If we are past the end of the POD window (box 636), the routine checks to see if the routine's internal POD Flag has been set (box 638). If the POD Flag is set, this means that feed event's delivery has already been logged, and therefore the routine can simply exit. If the POD flag is not set, then, at this point the POD Flag is set, the POD Time is cleared, and the feed event is logged by storing the feed event's Delivery Stack record in a logging file and then removing the record from the Delivery Stack (box 640). Note that the POD Flag is a flag internal to the Delivery Logic routine, and is distinct from the POD Error Flag in the Delivery Stack records.

Referring back to FIG. 8A, if the POD cell at the specified washer is not active (box 614), the Delivery Logic routine continues with a different set of procedures at reference point B at the top of FIG. 8C.

Referring to FIG. 8C, the POD cell is inactive and the Delivery Logic routines checks for the end of the POD window (box 654). We are still in the POD window if the Transport Time is less than the Stored Transport Time plus the POF Time, plus half the Preflush Time in which case the routine exits. If we are at the end of the POD Window (box 654), the internal POD Flag is checked (box 656). If the POD Flag is set, this means that the feed event has already been logged and that there is nothing further that needs to be done. Thus the Delivery Logic routine exits.

If the internal POD Flag is not set (box 656), then this is our last chance to see if the POD cell at the specified washer has been active long enough to confirm delivery of the specified chemical.

If the POD Time is equal to at least 80% of the POF Time for the feed event (box 658) delivery of the specified chemical is confirmed, the POD Time is cleared, the POD Flag is set, and the feed event is logged (i.e., the record at the top of the Delivery Stack is copied into the logging file and then removed from the Delivery Stack) (box 660).

If the POD Time is less than 80% of the POF Time for the feed event (box 658), delivery of the specified chemical has failed. Thus the POD Flag is cleared, the POD Time is cleared, an internal error flag is set and the delivery failure is logged in the system's logging file.

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For instance, the present invention can be scaled up or down to handle systems which deliver much larger and much smaller quantities of chemicals than those delivered to the washers in an industrial or commercial laundry. In another alternate embodiment, chemicals could be transported down the distribution tube using water pressure from the water supply instead of using a transport pump. The principal features, such as using a single manifold and distribution line for several output ports, and proof of flow and proof of delivery can be used in many alternate embodiments of the invention. Similarly, the particular choice of equipment, such as the pumps, diversion valves and the like in the preferred embodiment are only exemplary of the many equipment choices that can be made for other embodiments of the invention.

What is claimed is:

1. A liquid chemical delivery system comprising:

a liquid distribution line having a plurality of output ports;

a plurality of valve means coupled to said liquid distribution line at said output ports, each valve means having a feed position for directing liquid in said distribution line to the corresponding output port and a bypass position for allowing liquid in said distribution line to bypass said corresponding output port;

a manifold coupled to said distribution line;

a plurality of pump means coupled to said manifold, each pump means including means for pumping a corresponding chemical into said manifold;

control means, coupled to said plurality of pump means and said plurality of valve means, for controlling the positions of each said valve means and for enabling specified ones of said pump means, thereby delivering specified chemicals to specified ones of said output ports;

proof of flow conductivity sensing means, coupled to said control means, for detecting the presence of chemicals in said manifold; and a plurality of proof of delivery conductivity sensing means, coupled to said control means, each said proof of delivery conductivity sensing means located at one of said output ports for detecting delivery of chemicals to said output port;

said control means monitoring said proof of flow conductivity sensing means to verify that specified chemicals are dispensed into said manifold and to determine how long it takes to dispense said specified chemicals; said control means also monitoring said plurality of proof of delivery conductivity sensing means to verify passage of each specified chemical through a specified one of said valve means for a period of time corresponding to how long it took to dispense.

2. The liquid chemical delivery system set forth in claim 1, said control means comparing the amount of time that a specified chemical is pumped into said manifold with the amount of time that said chemical flows through one of said output ports, and confirming delivery of a specified chemical when the difference between said amounts of time does not exceed a predefined error margin.

3. The liquid chemical delivery system set forth in claim 1, further including means for pumping water through said manifold and distribution line after each time that one of said pump means pumps a chemical through said distribution line, thereby flushing said manifold and distribution line with water and separating the chemicals pumped through said distribution line with water;

said control means including means for reversing one of said pump means after said pump means has dispensed a corresponding chemical into said manifold and after said manifold has been subsequently flushed with water; thereby drawing water into said pump means;

whereby said pump means is exposed to said chemical only while dispensing said chemical, reducing chemical attack on said pump means.

4. A liquid chemical delivery system comprising:

a manifold for mixing chemical solutions;

a plurality of chemical pumps coupled to said manifold, each chemical pump having means for pumping a corresponding chemical into said manifold;

a liquid distribution line coupled to said manifold having a plurality of output ports;

a plurality of valve means, coupled to said liquid distribution line at said output ports, for diverting liquid flowing through said distribution line into the corresponding output port;

control means, coupled to said plurality of pump means and said plurality of valve means, for controlling each said valve means and for enabling specified ones of said pump means, thereby delivering specified chemicals to specified ones of said output ports; and a plurality of proof of delivery means, coupled to said control means, each said proof of delivery means located at one of said output ports for detecting delivery of chemicals to said output port;

said control means monitoring how long it takes to dispense each said specified chemical into said manifold and how long it takes said specified chemical to flow through one of said proof of delivery means; said control means comparing the amount of time that a specified chemical is pumped into said manifold with the amount of time that said chemical flows through one of said output ports; said control means confirming delivery of a specified chemical when the difference between said amounts of time does not exceed a predefined error margin.

5. The liquid chemical delivery system set forth in claim 4, further including:

proof of flow means, coupled to said control means, for determining when a chemical is present in said manifold; and autopriming means, coupled to said proof of flow means, for priming any specified one of said chemical pumps by activating with specified chemical pump until said proof of flow means verifies the presence of a chemical in said manifold means.

6. The liquid chemical delivery system set forth in claim 4, further including:

water supply means for supplying water to said manifold; and transport pump means for pumping water through said manifold and said distribution line after each time that a chemical is pumped into said manifold, thereby flushing said manifold and distribution line with water and separating the pumped chemicals with water;

said control means including means for reversing one of said pump means after said pump means has dispensed a corresponding chemical into said manifold and after said manifold has been subsequently flushed with water by said transport pump means; thereby drawing water into said pump means;

whereby said pump means is exposed to said chemical only while dispensing said chemical, reducing chemical attack on said pump means.

7. A method of delivering liquid chemicals, the steps of comprising:

providing a manifold, a plurality of chemical pumps for pumping corresponding chemicals into said manifold, a liquid distribution line coupled to said manifold having a plurality of output ports, and a diversion valve at each of said output ports for diverting liquid flowing through said liquid distribution line into the corresponding output port;

enabling a selected one of said chemical pumps and a selected one of said valves so as to deliver a specified chemical to a specified one of said output ports; and monitoring the conductivity of liquid flowing through said selected output ports so as to verify the delivery of said selected chemical to said selected output port;

monitoring how long it takes to dispense each said selected chemical into said manifold and how long it takes said selected chemical to flow through said selected one of said output ports, comparing the amount of time that said selected chemical is pumped into said manifold with the amount of time that said selected chemical flows through one of said output ports; said control means confirming delivery of a selected chemical when the difference between said amounts of time does not exceed a predefined error margin.

8. The liquid chemical delivery method set forth in claim 7, further including the step of:

autopriming any specified one of said chemical pumps by enabling said specified chemical pump and monitoring the conductivity of liquid in said manifold until the presence of a chemical in said manifold means is detected.

9. The liquid chemical delivery method set forth in claim 7, further including the steps of:

pumping water through said manifold and said liquid distribution line after each time that a chemical is pumped into said manifold, thereby flushing said manifold and liquid distribution line with water and separating the pumped chemicals with water;

reversing one of said chemical pumps after said chemical pump has dispensed a corresponding chemical into said manifold and after said manifold has been subsequently flushed with water, thereby drawing water into said pump means;

whereby said chemical pump is exposed to said chemical only while dispensing said chemical, reducing chemical attack on said chemical pump.

10. A method of delivering liquid chemicals, the steps of comprising:

providing a manifold, a plurality of chemical pumps for pumping corresponding chemicals into said manifold, a liquid distribution line coupled to said manifold having a plurality of output ports, and a diversion valve at each of said output ports for diverting liquid flowing through said liquid distribution line into the corresponding output port;

enabling a selected one of said chemical pumps and a selected one of said valves so as to deliver a specified chemical to a specified one of said output ports;

pumping water through said manifold and said liquid distribution line after each time that a chemical is pumped into said manifold, thereby flushing said manifold and liquid distribution line with water and separating the pumped chemicals with water; and reversing one of said chemical pumps after said chemical pump has dispensed a corresponding chemical into said manifold and after said manifold has been subsequently flushed with water, thereby drawing water into said pump means;

whereby said one of said chemical pumps is exposed to said chemical only while dispensing said chemical, reducing chemical attack on said one of said chemical pumps.

11. A method of delivering liquid chemicals, the steps of comprising:

providing a manifold, a plurality of chemical pumps for pumping corresponding chemicals into said manifold, a liquid distribution line coupled to said manifold having a plurality of output ports, and a diversion valve at each of said output ports for diverting liquid flowing through said liquid distribution line into the corresponding output port;

enabling a selected one of said chemical pumps and a selected one of said valves so as to deliver a specified chemical to a specified one of said output ports; and supplying water to said manifold as said selected chemical pump pumps a corresponding chemical into said manifold so as to produce a diluted chemical mixture;

measuring the amount of water supplied to said manifold;

measuring the amount of diluted chemical mixture exiting said manifold into said distribution line; and continuously, while dispensing a specified chemical, computing the difference between the amount of said chemical mixture exiting said manifold and the amount of water supplied to said manifold, and shutting off said selected chemical pump when said difference is equal to a specified amount;

whereby said specified amount of said specified chemical is metered and delivered to a selected output port.

12. The method of delivering liquid chemicals of claim 11, wherein both of said measuring steps are performed using a flow meter which is upstream of the point at which chemicals are pumped by said chemical pumps into said manifold; whereby the amount of chemical dispensed is measured without exposing the flow meter to said chemical.

13. A liquid chemical delivery system comprising:

a manifold for mixing chemical solutions;

a plurality of chemical pumps coupled to said manifold, each chemical pump having means for pumping a corresponding chemical into said manifold;

a liquid distribution line coupled to said manifold, transport pump means, coupling said manifold to said distribution line, for pumping liquid in said manifold into said distribution line;

water supply means coupled to said manifold for supplying water to said manifold; said water supply means including water metering means for measuring the amount of water supplied to said manifold; and a controller coupled to said chemical pumps, to said transport pump means and to said water metering means, said controller including means for enabling a selected chemical pump so as to pump a corresponding specified chemical into said manifold;

means for determining the amount of water supplied by said water supply means to said manifold;

means for determining the amount of diluted chemical mixture pumped by said transport pump from said manifold into said distribution line; and means for substantially continuously, while dispensing a specified chemical, computing the difference between the amount of said chemical mixture pumped into said distribution line and the amount of water supplied to said manifold, and shutting off said selected chemical pump when said difference is equal to a specified amount;

whereby said specified amount of said specified chemical is metered and delivered to a selected output port.

14. The method of delivering liquid chemicals of claim 13, wherein both of said means for determining an amount include a flow meter which is located upstream of the point at which chemicals are pumped by said chemical pumps into said manifold; whereby the amount of chemical dispensed is measured without exposing the flow meter to said chemical.

15. The liquid chemical delivery system set forth in claim 13, further including proof of flow conductivity sensing means, coupled to said control means, for detecting the presence of chemicals in said manifold; and a plurality of proof of delivery conductivity sensing means, coupled to said control means, each said proof of delivery conductivity sensing means located at one of said output ports for detecting delivery of chemicals to said output port;

said control means monitoring said proof of flow conductivity sensing means to verify that specified chemicals are dispensed into said manifold and to determine how long it takes to dispense said specified chemicals; said control means also monitoring said plurality of proof of delivery conductivity sensing means to verify passage of each specified chemical through a specified one of said valve means for a period of time corresponding to how long it took to dispense.

16. The liquid chemical delivery system set forth in claim 15, said controller including means for enabling said transport pump to pump water from said water supply means through said manifold and distribution line after each time that one of said chemical pumps pumps a chemical into said manifold, thereby flushing said manifold and distribution line with water;

said controller reversing said one of said chemical pumps after said chemical pump has been shut off and said manifold has been subsequently flushed with water; thereby drawing water into said one of said chemical pumps;

whereby said one of said chemical pumps is exposed to said corresponding chemical only while dispensing said chemical, reducing chemical attack on said chemical pump.

17. The liquid chemical delivery system set forth in claim 13, said controller including means for enabling said transport pump to pump water from said water supply means through said manifold and distribution line after each time that one of said chemical pumps pumps a chemical into said manifold, thereby flushing said manifold and distribution line with water;

said controller reversing said one of said chemical pumps after said chemical pump has been shut off and said manifold has been subsequently flushed with water; thereby drawing water into said one of said chemical pumps;

whereby said one of said chemical pumps is exposed to said corresponding chemical only while dispensing said chemical, reducing chemical attack on said chemical pump.

* * * * *

UNITED STATES PATENT AND TRADEMARK OFFICE

CERTIFICATE OF CORRECTION

PATENT NO. : 5,014,211

DATED : May 7, 1991
INVENTOR(S) : James R. Turner, Stephen G. Hosking & James W. Livingston It is certified that error appears in the above-indentified patent and that said Letters Patent is hereby corrected as shown below:

In Column 22:

Claim 7, line 53 replace "selected output ports" with --specified output ports--;

lines 54-55 replace "selected" with --specified--;

line 63 replace "said control means" with --and--.

In Column 24:

Claim 13, line 41 after "said transport pump" add --means--.

Claim 14, line 54 replace "method of delivering liquid chemicals" with --liquid chemical delivery system--.

Claim 15, line 64 replace "control means" with --controller--;

line 67 replace "control means" with --controller--.

In Column 25:

Claim 15, line 3 replace "control means" with --controller--;

line 7 replace "control means" with --controller--.

Claim 16, line 16 after "transport pump" insert --means--.

UNITED STATES PATENT AND TRADEMARK OFFICE

CERTIFICATE OF CORRECTION

PATENT NO. : 5,014,211

DATED : May 7, 1991

INVENTOR(S) : James R. Turner, Stephen G. Hosking & James W. Livingston

It is certified that error appears in the above-indentified patent and that said Letters Patent is hereby corrected as shown below:

In Column 26:

Claim 17, line 10 after "transport pump" insert --means--.

Signed and Sealed this

Fourteenth Day of December, 1993

Attest:

BRUCE LEHMAN

Attesting Officer

*Commissioner of Patents and Trademarks*